United States Patent

Barkley et al.

[11] Patent Number: 6,064,171
[45] Date of Patent: May 16, 2000

[54] HOST BASED STEPPER MOTOR PHASE CONTROLLER AND METHOD THEREFOR

[75] Inventors: Lucas David Barkley; Mark Walter Fagan, both of Lexington; Randall David Mayo, Georgetown, all of Ky.

[73] Assignee: Lexmark, International, Inc., Lexington, Ky.

[21] Appl. No.: 09/330,592

[22] Filed: Jun. 11, 1999

[51] Int. Cl.[7] ........................................ H02P 8/32
[52] U.S. Cl. ............................. 318/696; 318/702
[58] Field of Search ................... 318/685, 696, 318/254, 702

[56] References Cited

U.S. PATENT DOCUMENTS

| | | |
|---|---|---|
| 3,812,414 | 5/1974 | Abraham et al. . |
| 3,813,592 | 5/1974 | Ryberg . |
| 3,838,258 | 9/1974 | Logan . |
| 4,130,786 | 12/1978 | Jacques . |
| 4,147,967 | 4/1979 | Aiena . |
| 4,258,622 | 3/1981 | Estrabaud et al. . |
| 4,268,785 | 5/1981 | Svendsen . |
| 4,310,790 | 1/1982 | Mulet-Marquis . |
| 4,313,074 | 1/1982 | Nomura et al. . |
| 4,328,452 | 5/1982 | Ragen et al. . |
| 4,387,642 | 6/1983 | Bringhurst et al. . |
| 4,477,747 | 10/1984 | Palombo et al. . |
| 4,496,892 | 1/1985 | Bugatto, Jr. . |
| 4,540,924 | 9/1985 | Suzuki . |
| 4,546,299 | 10/1985 | Veale . |
| 4,590,495 | 5/1986 | Okamura . |
| 4,600,868 | 7/1986 | Bryant ................................. 318/567 |
| 4,602,197 | 7/1986 | Mattson . |
| 4,648,026 | 3/1987 | Petrick . |
| 4,672,283 | 6/1987 | Kobayashi . |
| 4,691,153 | 9/1987 | Nishimura ............................ 318/696 |
| 4,691,154 | 9/1987 | Sato et al. ............................ 318/696 |
| 4,703,242 | 10/1987 | Kumazawa et al. . |
| 4,706,008 | 11/1987 | Cronch et al. . |
| 4,707,649 | 11/1987 | Kanemura . |
| 4,710,691 | 12/1987 | Bergstrom et al. . |
| 4,734,847 | 3/1988 | Hunter . |
| 4,869,610 | 9/1989 | Nishizawa et al. . |
| 4,988,932 | 1/1991 | Markis et al. . |
| 5,038,088 | 8/1991 | Arends et al. . |
| 5,227,709 | 7/1993 | Gauthier et al. ..................... 318/685 |
| 5,369,428 | 11/1994 | Maze et al. . |
| 5,433,541 | 7/1995 | Hieda et al. . |
| 5,446,355 | 8/1995 | Janosky et al. . |
| 5,767,651 | 6/1998 | Boillat et al. . |

*Primary Examiner*—Bentsu Ro
*Attorney, Agent, or Firm*—Needle & Rosenberg, P.C.; D. Brent Lambert

[57] ABSTRACT

The invention is a host-based stepper motor controller that reduces velocity overshoot and settling time. A typical embodiment of the invention will include a stepper motor, a carrier mechanically coupled to the stepper motor, a processor for controlling the stepper motor and a driver circuit allowing communication between the processor and the stepper motor. The processor control reduces velocity overshoot and settling time by guaranteeing that each move begins on the stepper motor phase that optimally reduces velocity overshoot and settling time. The processor generates an initial value indicative of the extent of a current move of a carrier mechanically coupled to a stepper motor. Next, the start phase of the current move is determined along with the direction of the next move. Based on the initial value, the current move start phase and the next move direction, the initial value is adjusted to a new value where the new value is indicative of a move that causes the next move to begin on the optimal start phase of the stepper motor predetermined to minimize velocity overshoot and settling time. The new value is communicated directly or after translation to the driver circuit causing the stepper motor to move the carrier the appropriately.

19 Claims, 5 Drawing Sheets

HOST BASED STEPPER MOTOR PHASE CONTROLLER AND METHOD THEREFOR

BACKGROUND OF INVENTION

1. Field of Invention

The invention relates to a system and method for controlling the phase of a stepper motor. More specifically, the invention relates to a host-based stepper motor phase controller.

2. Description of Prior Art

Figure 1:
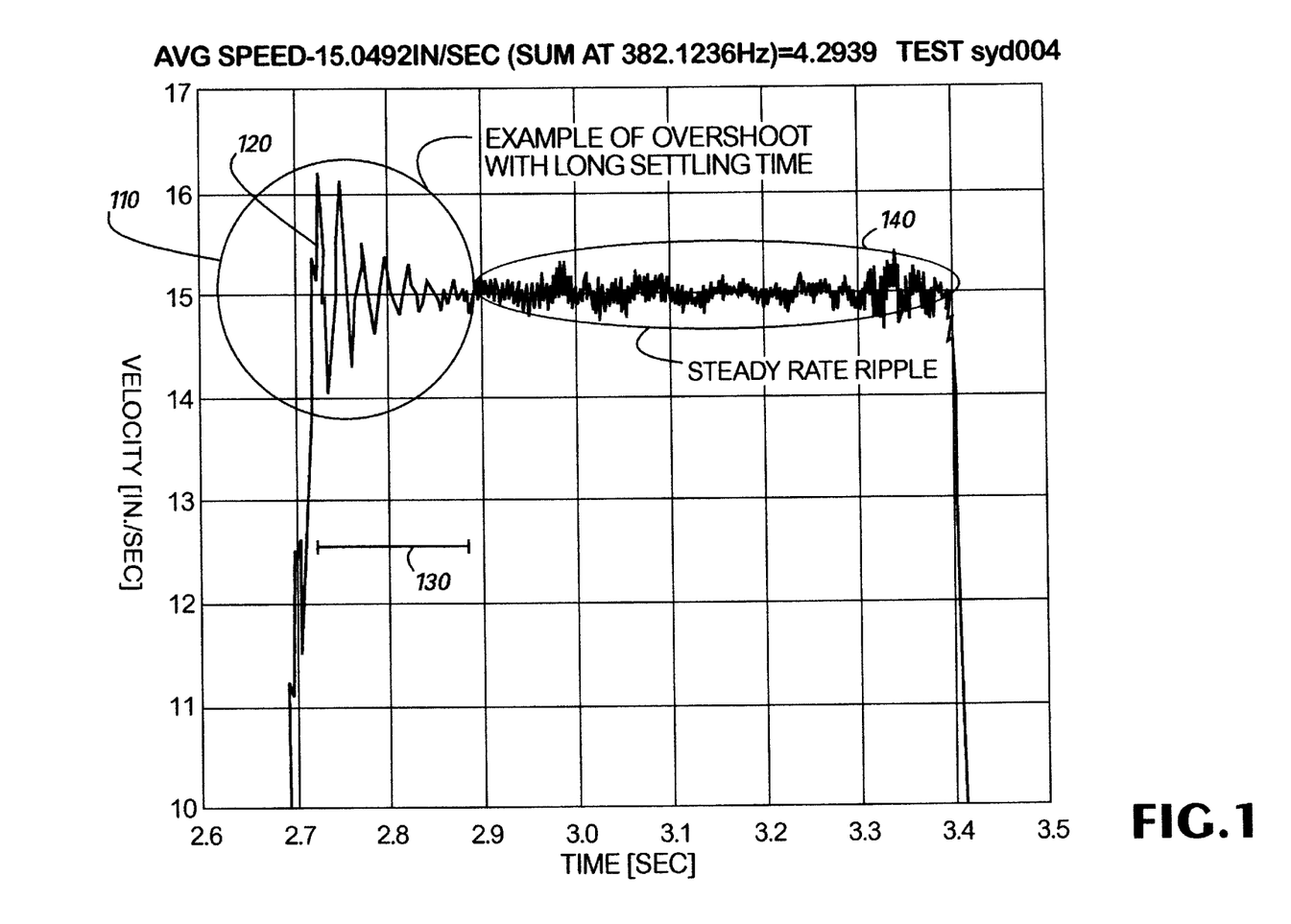
FIG. 1 is a graph displaying the problems of velocity overshoot and steady state rippling.

Many open-loop stepper motor carrier systems suffer from velocity overshoot with a long settling time and steady state ripple effect as seen in FIG. 1. To generate the plot in FIG. 1 the motor carrier system was instrumented using a linear encoder strip and matching encoder to measure carrier position. The position versus time data was differentiated to get carrier velocity versus time.

The region from approximately 2.7 seconds to 2.9 seconds 110 graphically displays the velocity overshoot. The carrier accelerates from a base velocity to its target velocity, 15 inches/second in FIG. 1. The carrier, however, does not stop accelerating at this target velocity but overshoots it 120. During the settling time 130, the carrier velocity oscillation decays to zero.

Optimally, the velocity of the carrier would be constant at the target velocity. Practically, however, systems exhibit a steady state ripple about the target velocity as exhibited in region 140. The ripple effect is an inherent characteristic of the system. A variety of solutions exist for reducing the extent of this ripple by mechanically softening the system. This softening is accomplished by softening the belt to carrier interface, softening the belt to motor pulley interface, softening the idler pulley to belt interface or other appropriate mechanical softening option, or combination of such mechanical softening options.

Overshoot is a very serious problem in an open-loop carrier system. A limited measure of overshoot reduction results from the mechanical softening that reduces steady state ripple; however, additional overshoot reduction is beneficial.

Figure 2:
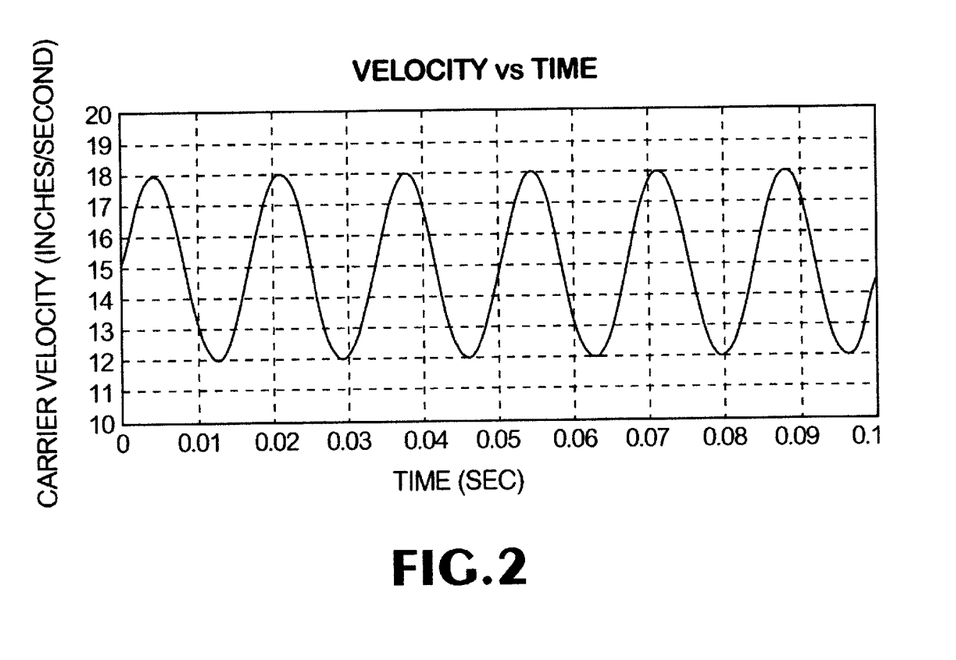
FIG. 2 is a graph of typical oscillatory velocity versus time.
Figure 3:
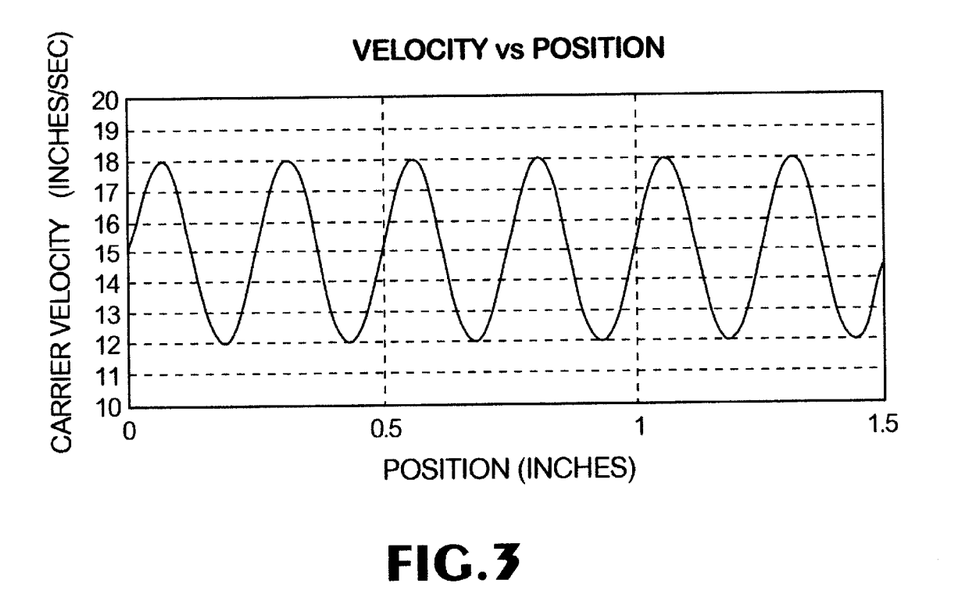
FIG. 3 is a graph using the same data as FIG. 2 plotted as velocity versus position on the paper.
Figure 4:
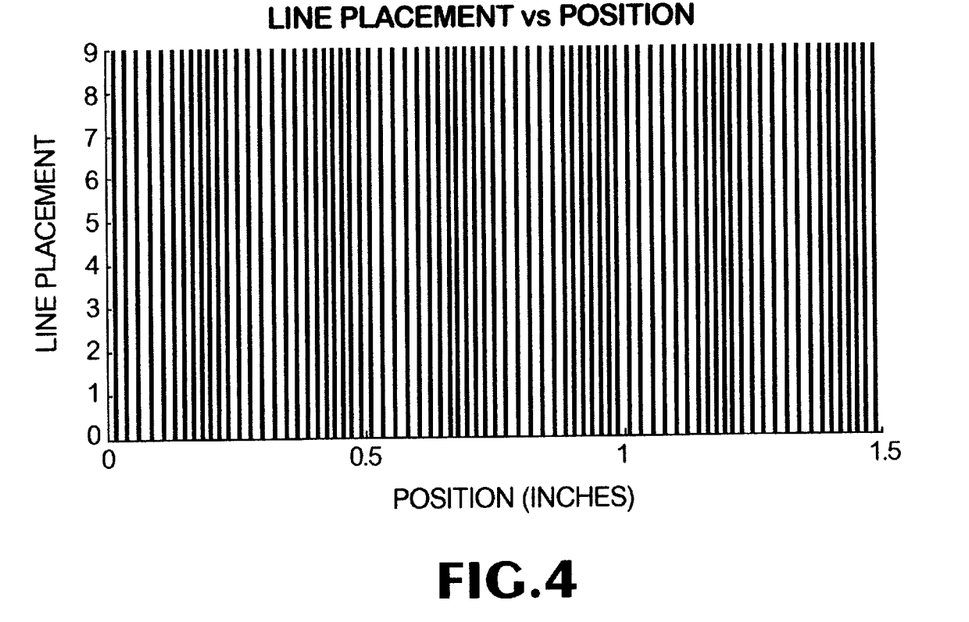
FIG. 4 is an illustration of vertical banding resulting from oscillatory velocity of a carrier including an inkjet print head.

For instance, in an inkjet printer using an open-loop carrier system to move print heads that fire ink drops onto print media (such as the Lexmark 3200 inkjet printer), the velocity must remain virtually constant to ensure accurate dot placement while printing. In such a use, accelerating the carrier and achieving a steady state velocity quickly in order to begin placing dots is a significant issue. Overshoot problems in this context create vertical banding, a compression and decompression of dots at a frequency visible to the human eye. FIG. 2 displays a typical oscillatory velocity versus time graph while FIG. 3 presents the same data platted as velocity versus position on the paper. Since dots are fired assuming a constant velocity, attempts to print equally space lines with oscillating velocity results in vertical banding as illustrated in FIG. 4. FIG. 4 graphs line placement versus paper position using the oscillatory velocity displayed in FIGS. 2 and 3. The same vertical banding shown in this group of lines also appears in other print jobs such as pictures and images.

Current open-loop stepper control systems generally take two approaches to overshoot reduction in addition to mechanical softening. The first approach involves the inclusion of additional circuitry on the printer to reduce overshoot. For example, one such system utilizes a circuit to reduce transient overshoot during start up of a stepper motor. This controller supplies a number of pulses in rapid succession to the motor drive circuits. This generates a negative torque in the stepper motor preventing overshoot. A disadvantage of this approach is the requirement that additional circuitry be included with the motor. As a consequence, updating an existing motor requires the installation of additional hardware.

Another general approach to overshoot reduction is the optimization of the ramp tables that control the acceleration and deceleration of the carrier. This approach does not suffer from the additional hardware requirement since modifications to an existing motor controller need only require the update of ramp table data that could be accomplished via a remote download. The problem with ramp table optimization is that a table optimized to reduce overshoot while the carrier is travelling in one direction does not necessarily optimize the table to reduce overshoot while the carrier is travelling in the other direction.

Current controller systems that reduce overshoot have a variety of disadvantages. First, many current systems require additional circuitry on the system itself. Further, attempts to reduce overshoot by optimizing acceleration and deceleration ramp tables leads to inconsistent carrier behavior when travelling in different directions.

SUMMARY OF THE INVENTION

According to the teachings of the present invention, a host based stepper motor phase controller supports overshoot reduction while not requiring the installation of additional hardware. Further, this controller does not suffer from inefficiencies resulting from optimizing ramp tables with respect to a particular direction of carrier travel.

In one embodiment, the invention includes a stepper motor, a carrier mechanically coupled to the stepper motor, a processor for controlling the stepper motor and a driver circuit allowing communication between the processor and the stepper motor. The processor reduces velocity overshoot and settling time by adjusting moves so that each move begins on the stepper motor phase that optimally reduces velocity overshoot and settling time for that move direction.

The processor generates an initial value indicative of the extent of a current move of a carrier mechanically coupled to the stepper motor, such as move length, target position, stepper motor phases of motion or other similar value. Next, the start phase of the current move is determined and the direction of the next move. The initial value is adjusted to a new value. This new value is indicative of a move that causes the next move to begin on the optimal start phase of the stepper motor predetermined to minimize velocity overshoot and settling time. The adjustment to the initial value is based on the initial value, the start phase of the current move and the direction of the next move. The processor communicates the new value, directly or after translation, to the driver circuit causing the stepper motor to move the carrier accordingly.

DETAILED DESCRIPTION OF THE INVENTION

A preferred embodiment of the invention is now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The present invention relates to a host-based system and method to reduce overshoot and settling time for a stepper motor to reach a constant velocity. The amount of overshoot and settling time is related to the starting phase of the stepper motor depending upon whether the motor is traveling in the forward or reverse direction.

Figure 5:
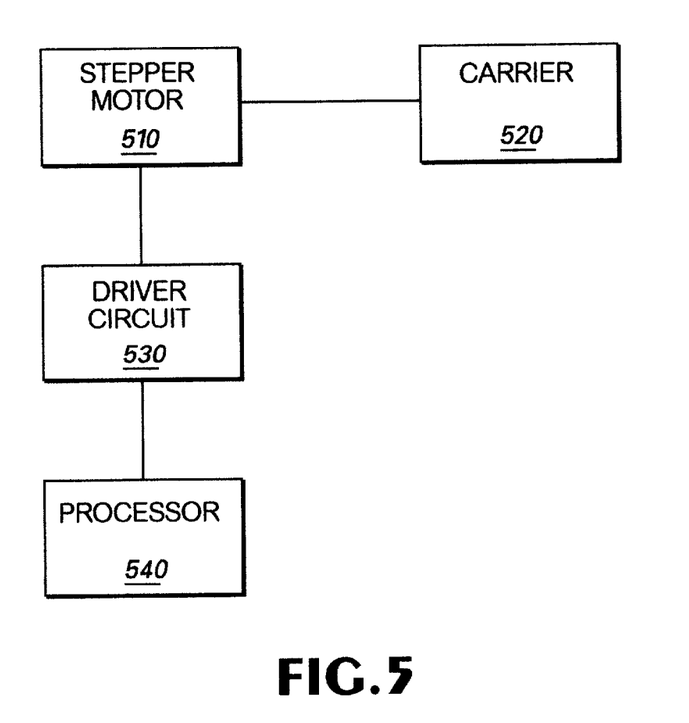
FIG. 5 is a block diagram of a typical system according to the invention.

A block diagram of a typical system embodiment of the invention is shown in FIG. 5. A stepper motor 510 is mechanically coupled with a carrier 520. The coupling allows the stepper motor to cause the carrier to move. The driver circuit 530 interfaces between a processor 540 and the stepper motor 510. Commands from the processor 540 are communicated to the driver circuit 530 that in turn communicates with the stepper motor 510. The processor 540 generates an initial target length for a current move of the carrier 520. Then, the processor 540 determines the starting phase of the stepper motor 510 for the current move and a direction for a next move of the carrier 530. The start phase can be determined in several ways such as retrieved as a stored value, assumed based upon the direction of the current move and a known initial start phase or calculated by other similar mechanism. From the initial target length of the current move, the start phase of the current move and the direction of the next move, the processor 540 adjusts the initial target length to a new target length such that the new target length causes the next move of the carrier 520 to begin on a phase of the stepper motor 510 predetermined to minimize velocity overshoot and settling time. The processor 540 communicates the new target length to the driver circuit 530, thereby causing the stepper motor 510 to move the carrier 520 a distance corresponding to the new target length. In this situation the carrier move is lengthened so as to guarantee that the start phase of the next move coincides with the optimal start phase for reducing overshoot and settling time for the determined direction of the next move.

In one embodiment, the adjustment process is based on calculations relative to the absolute optimal start phase for reducing overshoot and settling time for the determined direction of the next move. Under this approach, the processor 540 first calculates the phase at which the next move would start without any adjustment to the initial target length by translating the initial length into stepper motor phases and adding this to the start phase of the current move. This result is divided by the number of phases in a full cycle for the stepper motor 510, and the remainder from this division is retrieved as the unadjusted start phase for the next move. If this unadjusted start phase corresponds to the optimal start phase for reducing overshoot and settling time for the determined direction of the next move, a zero value adjustment is used to modify the initial target length to the new target length. If not, the processor 540 calculates the absolute value of the difference between the optimal start phase for reducing overshoot and settling time for the direction of the next move and the unadjusted start phase. This difference is converted into a delta length that is used to adjust the initial target position. The delta length will be either added to or subtracted from the initial target length depending upon the direction of travel of the carrier in the current move. Lengthening a move in the forward direction requires that the delta length be added while lengthening a move in the reverse direction requires that the delta length be subtracted.

In another embodiment, the adjustment process is based upon a full cycle move requirement and predetermined adjustment amount. In this approach, the processor 540 first adjusts the initial length of the current move to an intermediate length so that the move ends a whole number of stepper motor cycles after it begins. Next, the direction of the current move of the carrier 520 is determined if it was not already determined as part of the current move start phase determination. The processor 540 stores or programmatically encodes the absolute value of the difference between the optimal start phase for reducing velocity overshoot and settling time for moves in the forward direction and the optimal start phase for reducing velocity overshoot and settling time for moves in the reverse direction. The processor 540 maintains this difference in the phase or distance domain so long as calculations involving the value consistently use an appropriate domain. Where the direction of the current move does not match the direction of the next move, the difference is used to adjust the intermediate length to a new target length. Where the direction of the current move matches the direction of the next move, a zero phase or distance adjustment is used to adjust the intermediate length to the new target length.

It is understood that the aforementioned calculations are characterized in terms of values indicative of the extent of a move of the carrier such as stepper motor phases, lengths, motor angular rotations and positions. These values are interrelated and readily translatable from one to another. Those of ordinary skill in the art will recognize that any one of these values may be used for the purposes of defining the extent of a move.

In one printer embodiment, such as the Lexmark 3200 printer, a four-phase stepper motor is used. The carrier includes at least one print head. A processor such as a personal computer with printer driver software directs the movement of the print head via the stepper motor driver circuit.

One cycle of this motor consists of sixteen quarter-steps, or phases. The optimal start phase for this motor was determined to be phase numbers 7 or 15 for the forward direction and phase numbers 8 or 16 for the reverse direction. The printer motor is initialized for the first forward move to begin at phase 7 or 15.

Figure 6:
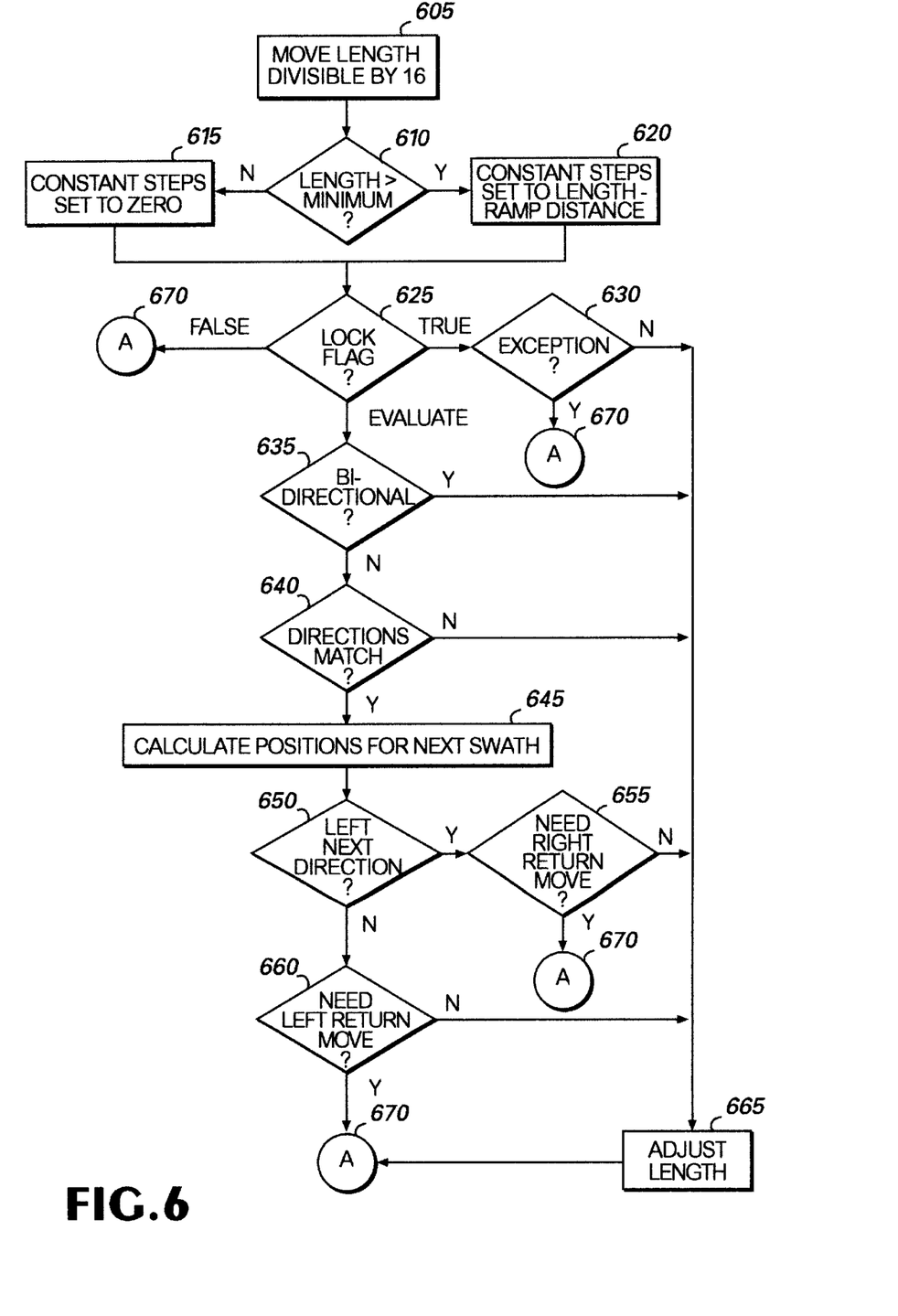
FIG. 6 is a flowchart of carrier move length adjustment in a printer embodiment.
Figure 7:
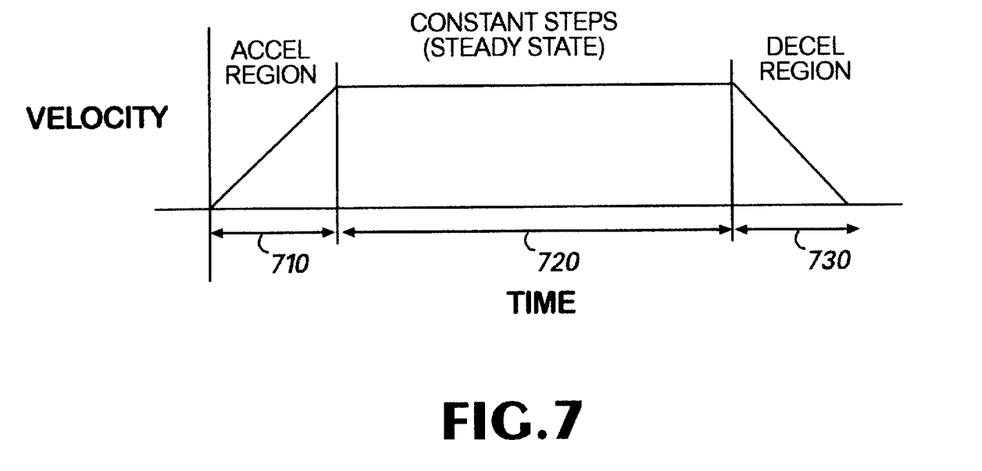
FIG. 7 is a graph illustrating a typical carrier move profile.

FIG. 6 displays a flowchart of the steps performed by the processor to adjust move length such that subsequent moves begin on a phase of the stepper motor that optimally reduces velocity overshoot and settling time. In step 605, the length of a move is increased if necessary so as to guarantee that the move ends a whole number of cycles after it begins. This is accomplished by making the move length viewed in terms of stepper motor phases evenly divisible by 16, the number of phases in a cycle for this stepper motor. In step 610, a determination is made as to whether the length of the move is greater than the minimum move length. FIG. 7 illustrates the move profile for a carrier. The carrier travels during three behavioral regions: acceleration 710, steady state 720 and deceleration 730. The minimum length that a carrier can move is the sum of the distance traveled during acceleration 710 and deceleration 730. This distance is referred to as the ramp distance and is evenly divisible by the number of phases in a complete cycle, 16 in this embodiment.

Based upon the determination in step 610, the length of the steady state portion of the move, the constant steps, is set as either zero where the move length is less than the minimum, step 615, or the move length minus the ramp distance where the move length is greater than the minimum, step 620. Next in step 625, a lock flag is checked to determine whether a modification is mandated. If the flag is false, the adjustment process ends 670 by making a null adjustment to the move length. If the flag is true, an adjustment is mandated. Step 630 determines whether an exception condition, such as initialization, short low speed moves or another defined exception, exists to counter the mandate. If an exception exists, the adjustment process ends 670 by making a null adjustment to the move length. If no exception exists, the move length is adjusted 665 and the adjustment process ends 670. In this embodiment, a one quarter step adjustment is required; one quarter step is the absolute value of the difference between the optimal start phase for reducing velocity overshoot and settling time for moves in the forward direction, 7 or 15, and the optimal start phase for reducing velocity overshoot and settling time for moves in the reverse direction, 8 or 16. A phase change between 7 and 8 or between 15 and 16 is a one quarter step difference. A phase change between 7 and 16 or between 8 and 15 would also be feasible but would require more complex manipulations. Because of the multiple locations for each direction, a slightly more complex implementation rounding all of the moves to lengths divisible by 8 could be used.

If the lock flag is set to neither true nor false in step 625, a process of further evaluation occurs with step 635. In step 635, a determination is made as to whether the printer is printing in bidirectional mode. If this is true, the move length requires an adjustment 665 after which the process ends 670.

If the printer is not in bidirectional mode, a determination is made as to whether a direction change occurs between the current move and the next move 640. If a direction change will occur, the move length requires an adjustment 665 after which the process ends 670.

If no direction change will occur, the current move and the next move are in the same direction. In this situation, a zero adjustment will usually be required since the current move will end a whole number of cycles after it began. As a consequence, the start phase for the next move will be guaranteed to be the optimal start phase for reducing velocity overshoot and settling time for moves in the that direction. An exception to this situation may exist.

Figure 8:
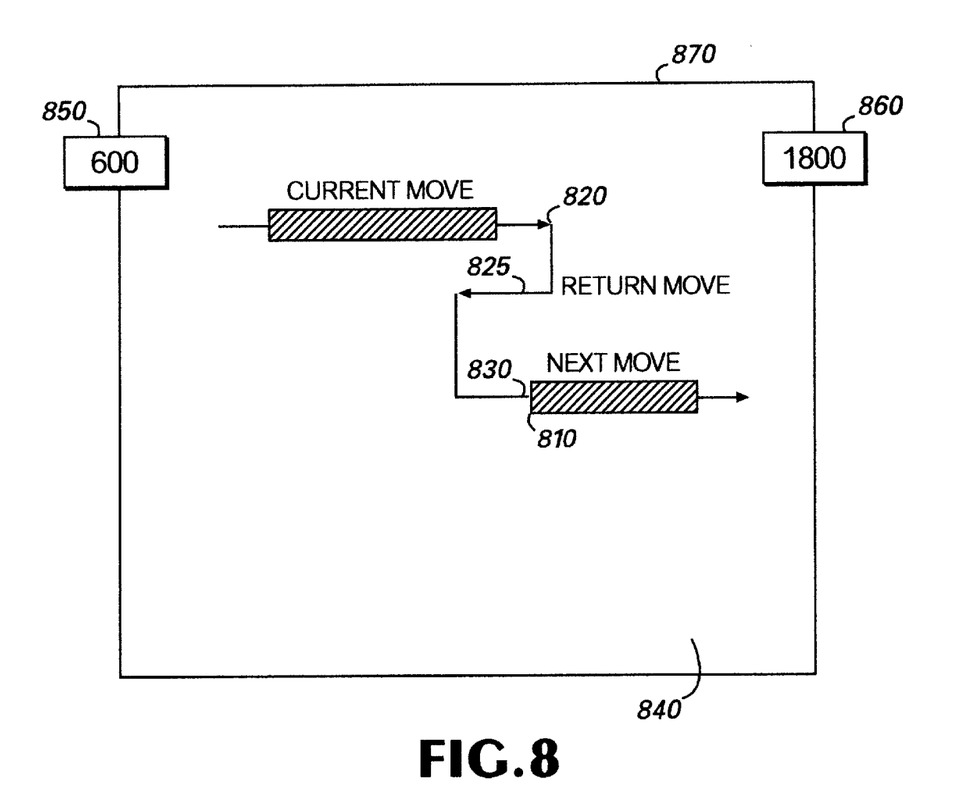
FIG. 8 is a diagram displaying a piece of paper in a printer and two carrier moves with respect to the paper.

As seen in FIG. 8, a piece of paper 840 is in the printer oriented with the top edge 870 up. The edges of the paper are positions 600 and 1800 respectively for the left 850 and right 860 edges. Where the print position for the next move 810 will be overshot by the end of the current move 820 and the necessary distance traveled during acceleration for the next move 830, a non-printing return move in the opposite direction will be required to position the carrier in preparation for the next actual print move. As this requires a change in direction, a non-zero adjustment for this return move 825 is needed.

Returning to FIG. 6, where no direction change is indicated in step 645, further calculations are necessary to determine whether the above exception exists. In step 645, the print positions for the next move are calculated. A determination is then made as to whether the next move is to the left, forward, or to the right, reverse, in step 650. Since the move directions are the same, the direction of the current move could alternatively be used in this determination. The direction of the move is significant because it determines whether the length attributable to acceleration for the next move 830 should be added to or subtracted from the print position for the next move 810.

In the case of a left move, a determination is made as to whether a right return move is necessary to prepare for the next left move 655. A right return move will be needed if the stop position of the current move 820 is less than or equal to the print position of the next move 810 plus the length attributable to acceleration for the next move 830. If a right return move is necessary, the move length requires an adjustment 665 after which the process ends 670. If a right return move is not necessary, a zero adjustment will be required since the current move will end a whole number of cycles after it began and the process ends 670.

In the case of a right move, a determination is made as to whether a left return move is necessary to prepare for the next right move 660. A left return move will be needed if the stop position of the current move is greater than or equal to the print position of the next move minus the length attributable to acceleration for the next move. If a left return move is necessary, the move length requires an adjustment 665 after which the process ends 670. If a left return move is not necessary, a zero adjustment will be required since the current move will end a whole number of cycles after it began and the process ends 670.

The embodiments described above are given as illustrative examples only. It will be readily appreciated that many deviations may be made from the specific embodiment disclosed in this specification without departing from the invention. Accordingly, the scope of the invention is to be determined by the claims below rather than being limited to the specifically described embodiment above.

What is claimed is:

1. A host-based stepper motor control system for reducing velocity overshoot and settling time, comprising:
   a) a stepper motor;
   b) a driver circuit in communication with the stepper motor;
   c) a carrier mechanically coupled to the stepper motor; and
   d) a processor in communication with the driver circuit for performing the steps of:
      i) generating an initial value indicative of the extent of a current move of the carrier;
      ii) determining a start phase of the stepper motor for the current move of the carrier;
      iii) determining a direction for a next move of the carrier;
      iv) adjusting the initial value to a new value such that the new value is indicative of a move that causes the next move of the carrier to begin on a phase of the stepper motor predetermined to minimize velocity overshoot and settling time based on the start phase of the current move and the direction of the next move; and
      v) communicating the new value to the driver circuit, thereby causing the stepper motor to move the carrier in a move corresponding to the new value.

2. The system of claim 1 wherein the generated initial value is an initial length of the current move and wherein the new value is a new length of a move that causes the next move of the carrier to begin on a phase of the stepper motor predetermined to minimize velocity overshoot and settling time.

3. The system of claim 2 wherein the processor adjusts the initial length for a current move by performing the substeps of:
   (1) adjusting the initial length to an intermediate length so that a move of the intermediate length would correspond to a whole number of cycles of the stepper motor;
   (2) where the directions of the current move and of the next move match, applying a zero length adjustment to the intermediate length to generate the new length; and
   (3) where the directions of the current move and of the next move do not match, applying an adjustment length corresponding to the absolute value of the difference between the optimal start phase for reducing velocity overshoot and settling time for moves in the forward direction and the optimal start phase for reducing velocity overshoot and settling time for moves in the reverse direction to the intermediate length to generate the new length.

4. The system of claim 3 wherein the substep applying the adjustment length where the directions of the current move and of the next move do not match adds the adjustment length to the intermediate length to generate the new length.

5. The system of claim 1 wherein the stepper motor is a 4-phase stepper motor.

6. The system of claim 5 wherein one cycle of the 4-phase stepper motor consists of sixteen quarter step phases.

7. The system of claim 6 wherein the generated initial value is an initial length of the current move and wherein the new value is a new length of a move that causes the next move of the carrier to begin on a phase of the stepper motor predetermined to minimize velocity overshoot and settling time.

8. The system of claim 7 wherein the processor adjusts the initial length for a current move by performing the substeps of:
   (1) adjusting the initial length to an intermediate length so that a move of the intermediate length would correspond to a whole number of cycles of the stepper motor;
   (2) where the directions of the current move and of the next move match, applying a zero length adjustment to the intermediate length to generate the new length; and
   (3) where the directions of the current move and of the next move do not match, applying an adjustment length corresponding to the absolute value of the difference between the optimal start phase for reducing velocity overshoot and settling time for moves in the forward direction and the optimal start phase for reducing velocity overshoot and settling time for moves in the reverse direction to the intermediate length to generate the new length.

9. The system of claim 8 wherein the substep applying the adjustment length where the directions of the current move and of the next move do not match adds the adjustment length to the intermediate length to generate the new length.

10. The system of claim 9 wherein the adjustment length corresponds to distance traveled by the carrier during one phase of the stepper motor.

11. The system of claim 1 wherein the carrier comprises a print head.

12. A method for reducing velocity overshoot and settling time in a stepper motor controller, comprising the steps of:
   a) generating an initial value indicative of the extent of a current move of a carrier mechanically coupled to a stepper motor;
   b) determining a start phase of the stepper motor for the current move of the carrier;
   c) determining a direction for a next move of the carrier;
   d) adjusting the initial value to a new value such that the new value is indicative of a move that causes the next move of the carrier to begin on a phase of the stepper motor predetermined to minimize velocity overshoot and settling time based on the start phase of the current move and the direction of the next move; and
   e) communicating the new value to a driver circuit, thereby causing the stepper motor to move the carrier in a move corresponding to the new value.

13. The method of claim 12 wherein the generated initial value is an initial length of the current move and wherein the new value is a new length of a move that causes the next move of the carrier to begin on a phase of the stepper motor predetermined to minimize velocity overshoot and settling time.

14. The method of claim 13 wherein a processor adjusts the initial value for a current move by performing the substeps of:
   i) adjusting the initial length to an intermediate length so that a move of the intermediate length would correspond to a whole number of cycles of the stepper motor;
   ii) where the directions of the current move and of the next move match, applying a zero length adjustment to the intermediate length to generate the new length; and
   iii) where the directions of the current move and of the next move do not match, applying an adjustment length corresponding to the absolute value of the difference between the optimal start phase for reducing velocity overshoot and settling time for moves in the forward direction and the optimal start phase for reducing velocity overshoot and settling time for moves in the reverse direction to the intermediate length to generate the new length.

15. The method of claim 14 wherein the substep applying the adjustment length where the directions of the current move and of the next move do not match adds the adjustment length to the intermediate length to generate the new target length.

16. A computer-readable, digital storage device storing executable instructions which causes a processor to control a stepper motor in a manner reducing velocity overshoot and settling time by performing the steps of:
   a) generating an initial value indicative of the extent of a current move of a carrier mechanically coupled to a stepper motor;
   b) determining a start phase of the stepper motor for the current move of the carrier;
   c) determining a direction for a next move of the carrier;
   d) adjusting the initial value to a new value such that the new value is indicative of a move that causes the next move of the carrier to begin on a phase of the stepper motor predetermined to minimize velocity overshoot and settling time based on the start phase of the current move and the direction of the next move; and
   e) communicating the new value to a driver circuit, thereby causing the stepper motor to move the carrier in a move corresponding to the new value.

17. The computer-readable, digital storage device of claim 16 wherein the generated initial value is an initial length of the current move and wherein the new value is a new length of a move that causes the next move of the carrier to begin on a phase of the stepper motor predetermined to minimize velocity overshoot and settling time.

18. The computer-readable, digital storage device of claim 16 wherein the processor adjusts the initial length for a current move by performing the substeps of:

i) adjusting the initial length to an intermediate length so that a move of the intermediate length would correspond to a whole number of cycles of the stepper motor;

ii) where the directions of the current move and of the next move match, applying a zero length adjustment to the intermediate length to generate the new length; and iii) where the directions of the current move and of the next move do not match, applying an adjustment length corresponding to the absolute value of the difference between the optimal start phase for reducing velocity overshoot and settling time for moves in the forward direction and the optimal start phase for reducing velocity overshoot and settling time for moves in the reverse direction to the intermediate length to generate the new length.

19. The computer-readable, digital storage device of claim 18 wherein the substep applying the adjustment length where the directions of the current move and of the next move do not match adds the adjustment length to the intermediate length to generate the new target length.

* * * * *